April 5, 1966 F. F. HODGE 3,244,003
LIQUID FLOW INDICATOR

Filed June 28, 1963 2 Sheets-Sheet 1

INVENTOR.
FRED F. HODGE
BY
Van Valkenburgh and Fields
ATTORNEYS

April 5, 1966  F. F. HODGE  3,244,003
LIQUID FLOW INDICATOR
Filed June 28, 1963  2 Sheets-Sheet 2

INVENTOR.
FRED F. HODGE
BY
Van Valkenburgh and Fields
ATTORNEYS

United States Patent Office 3,244,003
Patented Apr. 5, 1966

3,244,003
LIQUID FLOW INDICATOR
Fred F. Hodge, 10240 Melody Drive, Denver, Colo.
Filed June 28, 1963, Ser. No. 291,538
8 Claims. (Cl. 73—210)

This invention relates to liquid flow indicators, and more particularly to liquid flow indicators for indicating the volume of flow through a pipe over a given period of time. The present invention is an improvement upon the flow indicators of my U.S. Patents No. 2,827,008 of Mar. 18, 1958 and No. 2,991,651 of July 11, 1961.

Among the objects of this invention are to provide a novel liquid flow indicator; to provide such a flow indicator which produces a minimum of resistance to flow of liquid therethrough; to provide such a flow indicator wherein an indicating member is moved a minimum distance between no flow and maximum flow; to provide such a flow indicator which may exist as more than one embodiment; and to provide each such embodiment which is of simple construction yet is efficient in operation and of high reliability and reasonable accuracy.

Additional objects and the novel features of this invention will become apparent from the description which follows, taken in conjunction with the accompanying drawings, in which.

Figure 8:
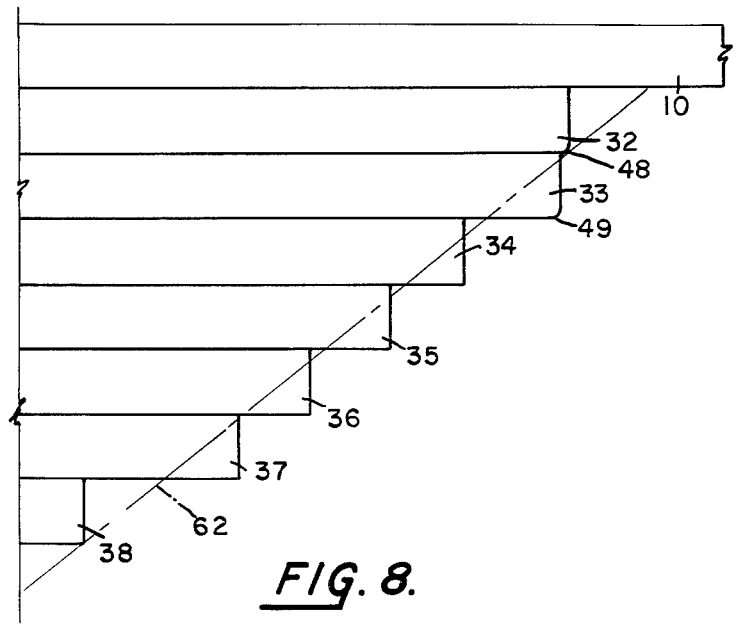
Figure 9:
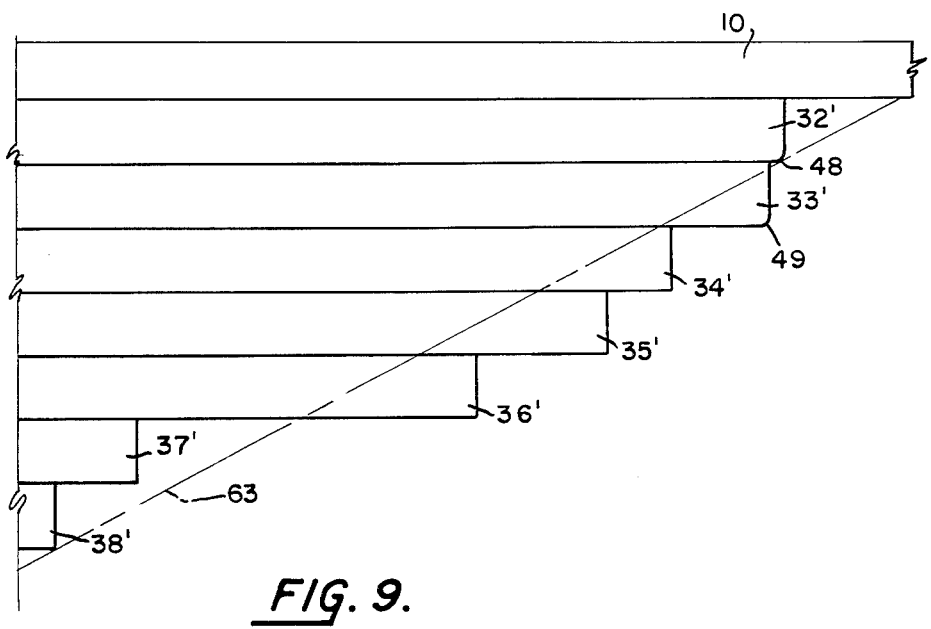

FIG. 8 is a diagram, illustrating the preferred dimensions of the edge of a plug for an indicator adapted to be installed in a one-inch pipe line, the edge of the plug being enlarged in the longitudinal direction and enlarged to a considerably greater extent in the lateral direction; and FIG. 9 is a similar diagram for the plug of an indicator particularly adapted to be installed in a one and one-half inch pipe line.

Figure 1:
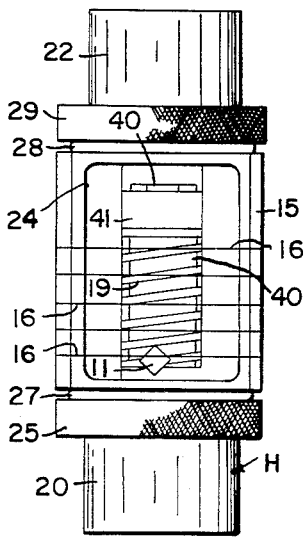
FIG. 1 is a side elevation of a flow indicator of this invention, forming one embodiment and in a position indicating no flow.
Figure 2:
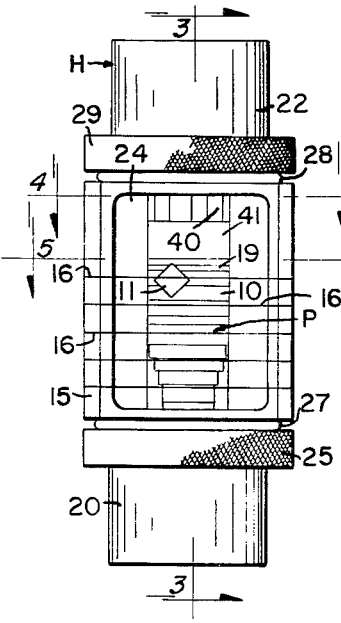
FIG. 2 is a side elevation, similar to FIG. 1, but in a position indicating maximum flow.
Figure 3:
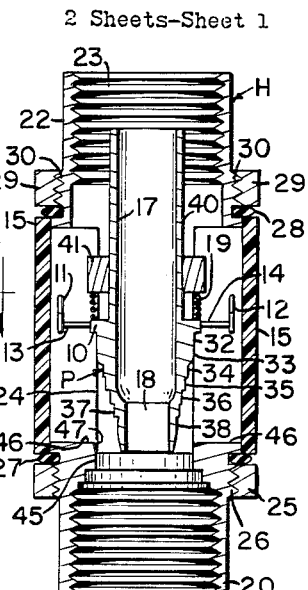
FIG. 3 is a longitudinal section, taken along line 3—3 of FIG. 2, showing particularly the construction of the parts in the interior of the flow indicator, including a plug.
Figure 4:
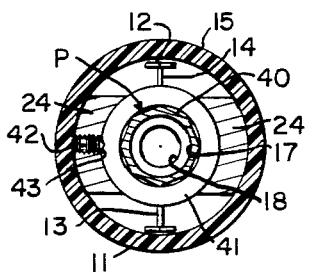
FIG. 4 is a transverse section, taken along line 4—4 of FIG. 2, showing further details of the construction of the flow indicator.
Figure 5:
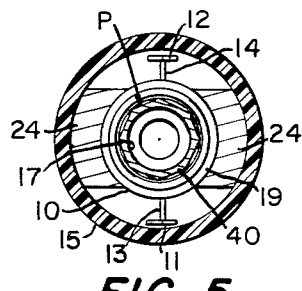
FIG. 5 is a transverse section, taken along line 5—5 of FIG. 2.

A liquid flow or flow rate indicator constructed in accordance with this invention may, as in FIGS. 1-5, include a hollow housing H within which may be installed a stepped plug P, the head or flange 10 of the plug being movable to different positions in accordance with the flow through the housing, the position of the plug being indicated by either one of indicators 11 and 12, which are each attached to head 10 by means of stems 13 and 14, respectively, as in FIG. 3. Indicators 11 and 12 are visible through a transparent sight tube 15, which may be provided with a series of conveniently equally spaced graduation marks 16 which, with indicators 11 and 12, provide one form of scale means for indicating the position of the plug. The marks 16, in accordance with the position of plug head 10, will indicate the rate of flow of liquid through the housing, it being noted that, in FIG. 1, the indicator 11 is in approximate alignment with the lowest mark 16, while in FIG. 2, indicator 11 is in approximate alignment with the highest mark 16. The marks 16 may be equally spaced when plug P has the preferred stepped configuration, as discussed below, although the graduation marks 16 may be calibrated for other stepped configurations, such as those disclosed and claimed in my aforesaid U.S. Patent No. 2,991,651.

In accordance with this invention, plug P is provided with a central, longitudinal hole 17 having a lower end 18 of reduced size, which provides a by-pass for the liquid normally flowing around the stepped plug. This by-pass not only reduces the amount which the plug moves, between positions of no flow and maximum flow, but also permits a coil spring 19, against which the plug moves, to be weaker, even for the reduced travel of the plug, thereby producing less resistance to the flow and creating a much smaller pressure drop through the indicator, which is of particular importance when lower flow rates and smaller pressures are involved. Quite unexpectedly, it has also been found that the bypass increases the accuracy of the indicator. It should be emphasized, of course, that the indicator of this invention is not to be considered as a precision instrument, such as a displacement meter, but is a relatively accurate indicator particularly adapted for industrial use. Thus, the commercial embodiments of this invention have an accuracy of ±10%, when measured against a displacement meter, and thus have as great or greater accuracy than other indicators selling at many times the price.

The housing H may be placed in any desired position, either vertical upright, horizontal, vertical upside down, or any position in between, although for convenience it is shown in a vertical position with its inlet at the bottom. Thus, a tubular inlet section 20 of the housing H may be provided with internal threads 21, as in FIG. 3, at its outer end for connection to piping which leads to the housing, while a tubular outlet section 22 of the housing may be provided at its outer end with internal threads 23 for connection to piping which leads from the housing, the flow through the housing as shown being from bottom to top. The sight tube 15 may be formed of plastic, glass or any other suitable transparent material, while the inlet and outlet sections of the housing may be connected by longitudinal ribs 24 which, as in FIGS. 4 and 5, may be arcuate on the inside to correspond to the outer diameter of head 10 of plug P and also arcuate on the outside to correspond to the inner diameter of sight tube 15. Graduations 16 may extend completely around sight tube 15, or may be placed on opposite sides thereof and the graduations aligned with the spaces between ribs 24. Sight tube 15 may be mounted in the housing in sealing relation in any suitable manner, as by an interiorly threaded collar 25 adapted to engage corresponding threads 26, on the outside of the inner end of inlet section 20 of the housing, and compress a sealing ring, such as an O-ring 27, against the corresponding end of sight tube 15. An O-ring 28 may be similarly pressed into sealing relation with the opposite end of sight tube 15 by an interiorly threaded collar 29 adapted to engage exterior threads 30 at the inner end of outlet section 19 of the housing. If desired, one of collars 25 or 29 may be merely a flange on the housing.

Plug P is provided with a series of cylindrical steps 32 to 38, inclusive, of decreasing diameter, as in FIG. 3, which are described later in connection with FIG. 8. Plug P is also provided with a tubular extension 40 at the top thereof which is adapted to move within a collar 41 which acts as a guide for the plug for its movement between the no flow position of FIG. 1 and the full flow position of FIG. 2. The exterior of extension 40 may be cylindrical, but is preferably polygonal, such as hexagonal or octagonal, as in FIGS. 4 and 5, so that the edges only of the polygonal shape will engage a cylindrical hole in collar 41, to reduce frictional resistance to movement of the plug. Conveniently, the collar 41 is held in position between ribs 24 by means of a set screw 42, as in FIG. 4, which is threadably received in one of ribs 24 and extends into a notch 43 in collar 41. Plug P moves out of and back into the inlet section 20 of housing H, which is provided with a throat section 45 through which the plug moves, while head or flange 10 of plug P, in the no flow position, seats against a shoulder 46 at the upper or inner end of throat section 45, which has a diameter slightly greater than the largest step 32. The inner edge 47 of shoulder 46 is preferably rounded, as in FIG. 3, to prevent step 32 or 33 catching thereon as plug P moves back to a seating position, while for a similar reason, the lower corner 48 of step 32 and the lower corner 49 of step 33 are also rounded, as in FIG. 8.

Figure 6:
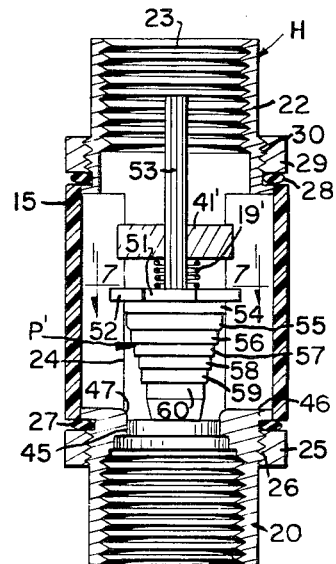
FIG. 6 is a longitudinal section, similar to FIG. 3, but showing an alternative plug construction.
Figure 7:
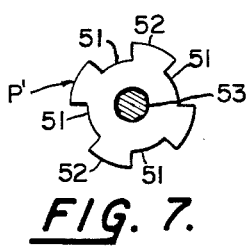
FIG. 7 is a fragmentary, transverse section, taken along line 7—7 of FIG. 6, showing particularly the top of the plug.

In the alternative embodiment shown in FIGS. 6 and 7, housing H is conveniently substantially identical, having parts indicated by the same reference numerals, while plug P' is solid in the center and the bypass is through slots or notches 51 in head or flange 52 of the plug, which also provides the indicator, or may be provided with one or more indicators similar to indicators 11 and 12. Slots 51 have convex, arcuate inner edges whose diameter is slightly greater than throat section 45 of the housing inlet, while the total circumferential extent of slots 52 is conveniently approximately half that of head 10. Plug P', which moves against a coil spring 19', is guided by a centrally extending stem 53 which moves in a central hole in a collar 41', conveniently secured to and between ribs 24 in a manner similar to collar 41, as in FIG. 4. Stem 53 may be cylindrical but is preferably polygonal, such as hexagonal or octagonal, as shown. Plug P' is provided with steps 54 through 60, inclusive, of decreasing diameter and proportioned in accordance with either FIG. 8 or FIG. 9 while the lower edges of steps 54 and 55, respectively, are rounded, as in the case of steps 32 and 33 of plug P.

For purposes of illustration, the steps of the plug have been shown diagrammatically in FIGS. 8 and 9 for the plug P of an indicator adapted to be mounted in a one inch line and a one and one-half inch line, respectively, wherein the diameters of the steps are drawn at a scale of 25X and the height of the steps are drawn at a scale of 4X, to bring out more clearly the relationship between the steps and the variations thereof from the dot-dash cone lines 62 and 63. Although the steps of FIG. 8 are indicated as those of plug P, while the steps 32' to 38', inclusive, of FIG. 9 are indicated as those of a larger plug P, it will be understood that plug P', in a smaller size, may have steps corresponding to those of FIG. 8, while plug P', in a larger size, may have steps corresponding to those of FIG. 9, although plug P', for the same spring pressure, will normally have intermediate steps closer to or even inwardly from the cone lines 62 and 63.

For the one inch size of FIG. 8, it will be noted that all of the intermediate steps extend outwardly beyond the cone line 62. With this arrangement, the plug does not tend to bob whenever the flow remains steady, as it does when the steps follow a true conical line. However, it will be noted that, for different spring pressures and different diameters, the diameter of the various steps on the plug are preferably changed. Thus, for the one and one-half inch size shown in FIG. 9, all of the intermediate steps extend outwardly beyond cone line 63, with the exception of the smallest intermediate step, i.e., step 37', which extends inside the cone line. The commercial flow indicator for a one inch pipe will measure the flow from zero to 40 gallons per minute, while the flow indicator for a one and one-half inch pipe will measure the flow from zero to 80 gallons per minute, each to a maximum pressure of 100 p.s.i. If the pressure exceeds this maximum, or if the size of the pipe in varied, the steps should be varied, so that the plug will move in equal increments for equal increases in flow. Thus, in the commercial indicator for ½ in. pipe (not shown), all of the intermediate steps of the plug extend outwardly beyond the cone line, with the exception of the largest intermediate step, which is inwardly of the cone line. In the commercial indicator for ¾ in. pipe, all of the plug steps extend outwardly beyond the cone line, which also is true of the plugs of the commercial indicators for 1½ in. and 2 in. pipe. When these indicators were calibrated with a pressure which did not exceed 100 p.s.i., the ½ in pipe indicator would indicate a flow of up to 12 gallons per minute, the ¾ in. pipe indicator up to 20 gallons per minute, the 1¼ in. pipe indicator up to 60 gallons per minute and the 2 in. pipe indicator up to 120 gallons per minute. Thus, the various sizes may be correlated with the expected maximum rate of flow.

From the foregoing, it will be evident that a liquid flow indicator constructed in accordance with this invention fulfills to a marked degree the requirements and objects hereinbefore set forth. A flow indicator has been provided which has a bypass to facilitate flow of fluid and reduce the resistance to flow caused by the plug, so that the readings will be more accurate and so that a weaker spring may be used to overcome the force of the plug when liquid is flowing. Thus, in one embodiment, a central bypass is provided in the plug, while in another embodiment, notches are provided in the head of the plug forming an external bypass around the plug. The indicator is of simple construction yet efficient and accurate in operation, using a stepped plug in which the steps thereof may be varied for different pressures and different diameter of pipe, as described above. For example, for each of a three-quarter inch, one inch, one and one-half inch and two inch pipe, all of the steps extend beyond a cone line defined by the first and last step of the plug, while for a one-half inch and one and one-half inch pipe, all of the steps extend beyond the cone line, with the exception of one step, which extends inside the cone line. As will be evident, the bypass for the plug may, if desired, be formed externally of the passage through the housing.

Although two forms of this invention have been illustrated and described, it will be understood that various changes and variations may be made and that the features of one embodiment may be incorporated in the other embodiment without the exercise of invention.

What is claimed is:
1. A flow rate indicator comprising:
 a housing having a passage therethrough and a fluid inlet and outlet connected with the opposite ends of said passage, said passage providing a shoulder between a first portion of greater cross sectional area in the direction of said outlet and a second portion of lesser cross sectional area in the direction of said inlet;
 a plug having a head disposed in said first passage portion and larger than said second passage portion, said head thereby being adapted to seat against said shoulder;
 said plug having a portion extending longitudinally from said head and into said second passage portion, said extending portion of said plug having a series of steps of a size decreasing in a direction away from said head;
 said plug also having a hole extending longitudinally therethrough to provide a bypass for fluid flowing through said housing;
 said plug further having a tubular extension in which is formed a portion of said bypass and extending from said head into said first passage portion;

a collar mounted in said housing for slidably receiving said extension and for guiding said plug; and scale means for indicating the position of said plug.

2. A flow rate indicator comprising a housing having a tubular fluid inlet section with a shoulder and a tubular fluid outlet section connected by circumferentially spaced, longitudinally extending ribs having arcuate inner and outer surfaces; a transparent cylindrical tube surrounding said ribs and extending between said inlet and said outlet section of said housing; sealing means for the opposite ends of said tube; a sleeve mounted in said housing between said ribs; a plug having a head adapted to seat against said housing shoulder and including a stem extending upwardly through said sleeve and adapted to be guided thereby during movement of said plug, said plug having a portion extending axially in a direction opposite said stem and having a series of steps of a size decreasing in a direction away from said head and movable into and out of said inlet portion; scale means indicating the position of said plug; and a bypass through at least one of said plug and said stem.

3. A flow rate indicator, as defined in claim 2, wherein said bypass includes a hollow passageway through said plug and said stem.

4. A flow rate indicator, as defined as claim 2, wherein said bypass is in said head of said plug.

5. A flow rate indicator, as defined in claim 4, wherein said bypass includes a plurality of notches in said head.

6. A flow rate indicator, as defined in claim 1, wherein:
said hole extending longitudinally through said plug is provided with a portion of lesser cross sectional area adjacent the end of said stepped portion remote from said head.

7. A flow rate indicator comprising:
a housing having a passage therethrough and a fluid inlet and outlet connected with opposite ends of said passage, said passage providing a shoulder between a first portion of greater cross sectional area in the direction of said outlet and a second portion of lesser cross sectional area in the direction of said inlet;
a plug having a head disposed in said first passage portion and larger than said second passage portion, said head thereby being adapted to seat against said shoulder;
said plug having a portion extending longitudinally from said head and into said second passage portion, said extending portion of said plug having a series of steps of a size decreasing in a direction away from said head;

said plug also having interior passage means extending longitudinally therethrough to provide a bypass for fluid flowing through said housing, said interior passage means having a portion of lesser cross sectional area adjacent the end of said stepped portion remote from said head; and scale means for indicating the position of said plug.

8. A flow rate indicator comprising:
a housing having a passage therethrough and a fluid inlet and outlet connected with opposite ends of said passage, said passage providing a shoulder between a first portion of greater cross sectional area in the direction of said outlet and a second portion of lesser cross sectional area in the direction of said inlet;
a plug having a head disposed in said first passage portion and larger than said second passage portion, said head thereby being adapted to seat against said shoulder;
said plug having a portion extending longitudinally from said head and into said second passage portion, said extending portion of said plug having a series of steps of a size decreasing in a direction away from said head;
said plug having a stem extending longitudinally from said head and disposed in said first passage portion;
a collar mounted in said first passage portion for slidably receiving said stem and for guiding said plug;
said head of said plug having a series of peripheral notches providing a bypass for fluid flowing past said plug, the inner edges of said notches being spaced outwardly from the edge of said shoulder; and
scale means for indicating the position of said plug.

References Cited by the Examiner

UNITED STATES PATENTS

| | | | |
|---|---|---|---|
| 2,377,861 | 6/1945 | Brewer | 73—209 |
| 2,400,479 | 5/1946 | Binford | 73—210 X |
| 2,645,124 | 7/1953 | Senesky | 73—209 |
| 2,647,402 | 8/1953 | Ibbott | 73—210 |
| 2,800,019 | 7/1957 | Rumble | 73—209 |
| 2,805,573 | 9/1957 | Emmons | 73—209 |
| 2,970,561 | 2/1961 | Ashwood | 116—117 |
| 2,991,651 | 7/1961 | Hodge | 73—210 |

FOREIGN PATENTS 504,468   4/1939   Great Britain.

RICHARD C. QUEISSER, *Primary Examiner.*

D. SCHONBERG, *Examiner.*